Figure 1:
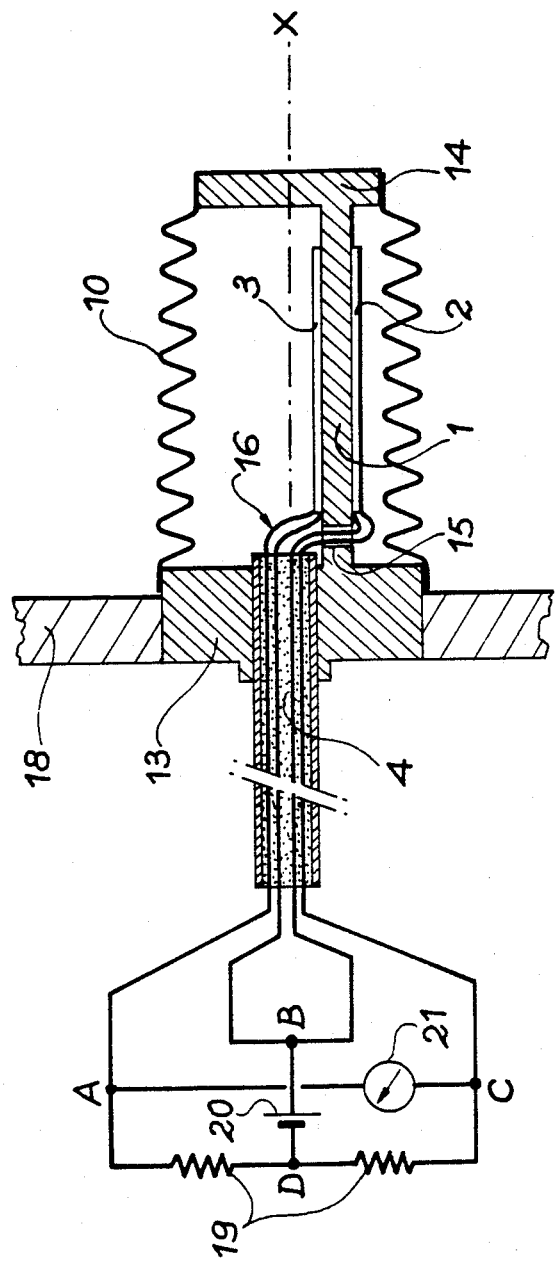

United States Patent [19]

Voituriez

[11] Patent Number: 4,836,028

[45] Date of Patent: Jun. 6, 1989

[54] PRESSURE TRANSDUCER

[75] Inventor: Bernard Voituriez, Grenoble, France

[73] Assignee: Commissariat A L'Energie Atomique, Paris, France

[21] Appl. No.: 81,297

[22] Filed: Aug. 3, 1987

[30] Foreign Application Priority Data

Aug. 4, 1986 [FR] France ................. 86 11272

[51] Int. Cl.$^4$ ............................. G01L 7/10; G01L 9/04
[52] U.S. Cl. ................................. 73/726; 73/729; 338/4
[58] Field of Search ................. 73/727, 726, 729, 708, 73/720, 721; 338/4

[56] References Cited

U.S. PATENT DOCUMENTS

| | | | |
|---|---|---|---|
| 420,570 | 2/1890 | Bristol | 73/729 |
| 2,405,199 | 8/1946 | Faust | 338/4 |
| 3,089,341 | 5/1963 | Gay | 73/746 |
| 3,343,420 | 9/1967 | Kondo et al. | 73/729 |
| 3,474,681 | 10/1969 | Eriksen | 73/862.65 |

FOREIGN PATENT DOCUMENTS 8300225 1/1983 World Int. Prop. O. .

Primary Examiner—Donald O. Woodiel
Attorney, Agent, or Firm—Pearne, Gordon, McCoy & Granger

[57] ABSTRACT

Small pressure transducer able to operate in wide temperature and pressure ranges, as well as in aggressive environmental conditions, i.e. corrosive, radioactive or vibratory conditions. It essentially comprises a strip or blade (1) extended by two cylinders (13, 14), to which are fixed the ends of a bellows (10) within which a vacuum is produced. The cylinder (14) is offcentered or offset with respect to strip (1). The compressive stresses induce a pure bending and compression of the strip (1). Two extensometers of extensometric gauges (2,3) located on opposite faces of strip (1) and whereof the deformations are taken by an electric circuit make it possible to characterize the bending.

6 Claims, 2 Drawing Sheets

PRESSURE TRANSDUCER

The present invention relates to a small pressure transducer intended to operate in very extensive temperature and pressure ranges, as well as under severe environmental conditions, i.e. radioactive and corrosive media, temperature gradients, presence of electric and magnetic fields. This transducer operates with the aid of extensometers or extensometric gauges.

Numerous other types of pressure transducers equipped with extensometers are used. They involve converting a pressure into a deformation of a structure to which are fixed a variable number of extensometers or gauges. The parameters which can justify a choice are the sensitivity and linearity of the deformation measured by the gauges with respect to the pressure, the value of the pressures, the overall dimensions of the transducer and its inherent frequency on working in a medium subject to mechanical vibrations and the aggressiveness of the external medium which is one of the reasons for which certain transducers use a means for insulating the surface on which are adhered the gauges of said external medium.

According to a transducer design similar to that of the invention, the gauges are adhered to the central branch of a U-shaped member, whereof the pressure to be measured moves apart of closes up the extreme branches. The sagging of the central branch consequently characterises the pressure to be measured. Thus, the transducer also comprises a deformable enclosure, such as a bellows, which is penetrated by the pressure. The ends of the enclosure deform the branches of the U with the aid of link rods. Thus, the bellows operates in tension, which is not advantageous. Moreover, the insertion of the bellows into the central space of the U requires that the latter has a relatively large size, much larger than is required by the size of the extensometers.

The present invention is directed at a relatively small pressure transducer combining a good precision with a high resistance to the external medium in so far as the zone on which are bonded the gauges is completely insulated therefrom. Moreover, the transducer can operate in very extensive pressure ranges.

More specifically this transducer comprises:

an elastic material strip having a rectangular section, whereof the bending or deflection is dependent on the pressure to be measured, which supports two active extensometric gauges or extensometers and is extended at its ends by two cylindrical parts in such a way that the strip is off centered or offset with respect to said two cylindrical parts, whereof one is used for ensuring the maintenance of the strip in the transducer and whereof the other is subject to the pressure to be measured;

an envelope insulating the strip from the external medium and fixed to the two solid parts, defining a tight space round the strip and a portion of said solid parts, the envelope having a negligible rigidity during the bending of the strip, but is able to withstand the pressures of the external medium on its outer surface.

According to a major feature of the invention, the strip has two extensometers disposed on the two faces of the strip, which form part of an electric circuit in which they compensate the thermal effects and supply the signal to be measured. Such a circuit with two gauges is necessary and adequate for optimising the sensitivity and for compensating the thermal effects.

Figure 2:
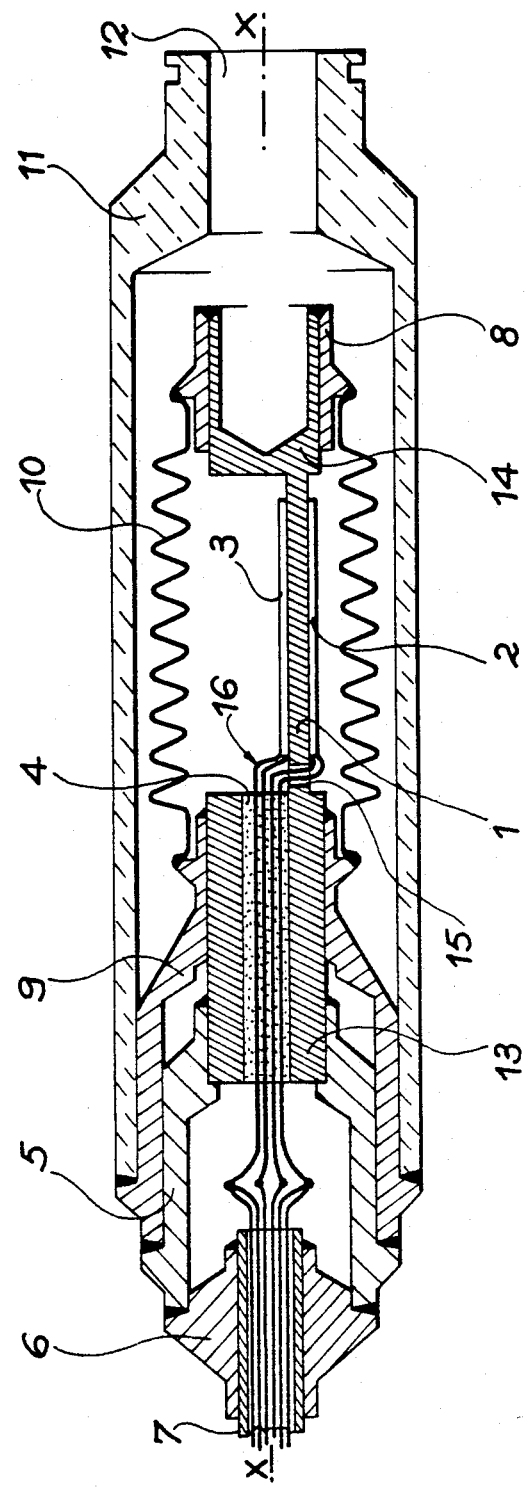

Two possible embodiments of the invention are illustrated with the aid of FIGS. 1 and 2, whose description follows. However, these are not the only embodiments which can be envisaged from are not given in a limitative manner.

Thus, FIG. 1 is a section of the transducer, whereof most of the parts have a symmetry of revolution about axis XX.

The transducer comprises a strip or blade 1 made from an elastic material, such as e.g. stainless steel, extended at its ends by two cylinders 13,14. The strip and the two cylinders are advantageously obtained by appropriately machining a bar section and thus form a single block. The strip 1 must be off centered and the axis of the two cylinders, whilst being parallel thereto. The importance or degree of the offcentering is dependent on the pressures which it is wished to measure. A marked off-centering is more precise for low pressures, whilst limited offcentering enables the transducer to withstand high pressures. The pressure to be measured is exerted on the portion of the cylindrical part 14 outside bellows 10. The resultant of the stresses produced by it is consequently non-zero and compresses strip 1, whilst at the same time deflecting or bending it, due to the offcentering of the application point of said resultant with respect to strip 1. The symmetry of revolution prevents the formation of a shearing stress on said strip and consequently there is pure bending, accompanied by compression. The deformations undergone by strip 1 are consequently homogeneous over its entire length. Therefore its dimensions can be chosen as the same order of magnitude as those of the extensometers 2 and 3, whereof there are advantageously two located on the two opposite faces of strip 1, so as to measure the deformations of the latter (in tension or compression) in the same direction. Thus, the overall dimensions are very small.

The second cylinder 13 ensures the recessing of strip 1 in the transducer. It is longitudinally bored in order to receive an alumina capillary 4 having four channels for the two wires 16 of each gauge 2 or 3. A supplementary bore 15 can be made in strip 1 for the passage of the two wires of gauge 2 opposite to capillary 4 within the same.

An essential feature of the invention is the presence of a generally cylindrical bellows 10 fixed to cylinders 14, 13, so as to confine strip 1 in a tight enclosure and in which the vacuum is produced on fitting the transducer. It is also possible to introduce into the same inert gas in order to prevent corrosion. Thus, the strip 1 is protected against pressurized fluid and in particular the face of cylinder 14 comprising the intersection with strip 1 is not exposed to the pressure of the external fluid, which leads to a thrust action of said cylinder 14 towards cylinder 13, which consequently compresses strip 1, whilst at the same time bending the same due to its offcentering. Bellows 10 has a negligible resistance with respect to these stresses, whilst it resists the axially symmetrical compressive stresses exerted by the fluid around it.

The gauge deformation values are transmitted, via wires 16, to a Wheatstone bridge connection enabling the taking of these values so as to eliminate the part corresponding to the pure compression and to the thermal effects. Thus, the value of this bending or deflection is very accurately and easily determined.

Gauges 2 and 3 are located between points A,B and B,C of an electric circuit. There are also two resistors 19, equal to the resistances of the unstressed gauges 2 and 3 between C,D ad D,A, an electromotive force 20 between B and D and a voltmeter 21 between A and C, which consequently measures the resistance variation of gauges 2 and 3 and characterises the pure bending of strip 1.

FIG. 2 shows another embodiment of the transducer according to the invention, where once again there is a strip 1, gauges 2,3, cylinders 13, 14, capillary 4 and bellows 10. The operation of the transducer and the electrical exploitation of the measurements are the same as hereinbefore. In this case, the transducer also comprises an external protective enclosure 11, preferably made from a refractory material, such as ceramic. Enclosure 11 is perforated or drilled at 12, so as to permit the penetration of the fluid, whose pressure is to be measured. A long, narrow bore permits a better insulation of the transducer against the temperature gradients which can occur in the fluid.

Wires 16 of gauges 2,3 pass into the bore of a connecting piece 5, which is closed at one end by cylinder 13 and whose other end is closed by a plug 6, which is however perforated so as to permit the passage of an electric cable 7, to which is welded wires 16. Finally, bellows 10 is connected to cylinders 14,13 via two end fittings 8,9.

These various modifications lead to a more complex transducer, but which is more robust than that of FIG. 1. It will consequently be used for more aggressive media.

In general terms, the connections between parts are provided by welding, hard soldering, bonding or any other process compatible with the materials in question and the ambient fluid.

Thus, the main advantages of the transducer are the simplicity of the phenomenon used for characterising deflection or bending, the small size in the absence of any dead volume and robustness making it possible to ensure linearity (hysteresis error below 0.2%) and the accuracy of its behavior in aggressive media and under difficult conditions. An effective realisation of the invention is intended to operate in a pressure range between quasi-vacuum and several thousand bars (overloads of 50% can be allowed without damaging the transducer) and temperatures between −200° C. and +900° C. Its small diamensions, diameter 6 to 15 mm and length 10 to 60 mm, guarantee a first high inherent frequency equal to or greater than 10 kHz and a response speed such that 80% of the measuring range provided can be traversed in less than 1 millisecond, so that this transducer is very valuable for characterising high pressure gradients.

Simple electronics and gauges make it possible to characterise the measuring range over a potential difference of 10 volts.

Thus, the transducer according to the invention has numerous advantages, whilst retaining the simplicity ensuring its low cost.

I claim:

1. A pressure transducer comprising:
   an elastic material strip (1) having a rectangular section, whereof the bending or deflection is dependent on the pressure to be measured, which supports two active extensometric gauges (2, 3) or extensometers and is extended at one end by a first solid part (13) and at the other by a second solid part (14) in such a way that the strip (1) is off centered or offset with respect to said solid parts, whereof the first solid part (13) is used for maintaining the strip in the transducer and whereof the second solid part (14) is subject to the pressure to be measured and tranmits compressive and bending deformations to the strip, said deformations being substantially uniform over the length of the strip, said strip and parts being made from a single block of elastic material; and
   an envelope (10) insulating the strip from the external medium and fixed to the two solid parts (14, 13) defining a hermetic space around the strip (1) and a portion of said second solid part (14), the envelope having a negligible rigidity with respect to the bending of the strip (1), but being able to withstand the pressure of the external medium on its outer surface.

2. A pressure transducer according to claim 1, characterised in that the envelope (10) is constituted by a bellows having a generally cylindrical contour.

3. A pressure transducer according to claim 1, characterised in that it comprises two gauges (2,3) located on the two faces of strip (1) and oriented so as to measure deformations in the same direction.

4. A pressure transducer according to claim 1, characterised in that the connecting wires (16) of gauges (2,3) pass through a capillary (4) located in a bore of solid part (13) and lead into a bored chamber formed in a connecting piece (5), where they are connected to the wires of an electric cable (7).

5. A pressure transducer comprising:
   an elastic material strip (1) having a rectangular section, whereof the bending or deflection is dependent on the pressure to be measured, which supports two active extensometric gauges (2, 3) or extensometers and is extended at one end by a first solid part (13) and at the other by a second solid part (14) in such a way that the strip (1) is off centered or offset with respect to said solid parts, whereof the first solid part (13) is used for maintaining the strip in the transducer and whereof the second solid part (14) is subject to the pressure to be measured and transmits compressive and bending deformations to the strip, said deformations being substantially uniform over the length of the strip;
   an envelope (10) insulating the strip from the external medium and fixed to the two solid parts (14, 13), defining a hermetic space around the strip (1) and a portion of said second solid part (14), the envelope having a negligible rigidity with respect to the bending of the strip (1), but being able to withstand the pressure of the external medium on its outer surface; and
   a protective enclosure (11) arranged around the solid part (14) and the envelope (10), which is almost closed and made from a refractory material.

6. A pressure transducer comprising:
   an elastic material strip (1) having a rectangular section, whereof the bending or deflection is dependent on the pressure to be measured, which supports two active extensometric gauges (2,3) or extensometers having substantially the same dimensions as the strip, said strip being extended at one end by a first solid part (13) and at the other by a second solid part (14) in such a way that the strip (1) is off centered or offset with respect to said solid parts, whereof the first solid part (13) is used for maintaining the strip in the transducer and whereof the second solid part (14) is subject to the pressure to be measured and transmits compressive and bending deformations to the strip, said deformations being substantially uniform over the length of the strip; and an envelope (10) insulating the strip from the external medium and fixed to the two solid parts (14, 13), defining a hermetic space around the strip (1) and a portion of said second solid part (14), the envelope having a negligible rigidity with respect to the bending of the strip (1), but being able to withstand the pressure of the external medium on its outer surface.

* * * * *